United States Patent [19]
Wakabayashi

[11] Patent Number: 5,272,498
[45] Date of Patent: Dec. 21, 1993

[54] MAGNETIC RECORDING APPARATUS IN A CAMERA

[75] Inventor: Tsutomu Wakabayashi, Yokohama, Japan

[73] Assignee: Nikon Corporation, Tokyo, Japan

[21] Appl. No.: 996,854

[22] Filed: Dec. 21, 1992

Related U.S. Application Data

[63] Continuation of Ser. No. 892,638, Jun. 2, 1992, abandoned, which is a continuation of Ser. No. 791,304, Nov. 14, 1991, abandoned, which is a continuation-in-part of Ser. No. 644,520, Jan. 23, 1991, abandoned.

[30] Foreign Application Priority Data

Jan. 30, 1990 [JP] Japan ................................. 2-17877
Nov. 19, 1990 [JP] Japan ................................. 2-311364

[51] Int. Cl.$^5$ ............................................. G03B 17/24
[52] U.S. Cl. ...................................................... 354/105
[58] Field of Search ...................... 354/21, 75, 76, 105, 354/106

[56] References Cited

U.S. PATENT DOCUMENTS 4,860,037 8/1989 Harvey ................................ 354/21
5,016,030 5/1991 Dwyer et al. ...................... 354/21

Primary Examiner—Michael L. Gellner
Assistant Examiner—Howard B. Blankenship
Attorney, Agent, or Firm—Shapiro and Shapiro

[57] ABSTRACT

A still camera usable with film having a recording medium for recording optical information obtained by photographing and various magnetic information loaded in the camera body comprises a magnetic head for recording the magnetic information on the recording medium with movement of the film, a magnetic head driving device for selectively moving the magnetic head to a position retracted from the film surface and a position urged against the film surface, a discriminating device for discriminating between a one-frame photographing mode and a continuous photographing mode, and a control device for controlling the magnetic head driving device according to the photographing mode. With the one-frame mode, the magnetic head is urged against the film surface after termination of photographing to record magnetic information and is then moved to the retracted position after termination of one-frame movement of the film. With the continuous mode, the magnetic head is urged against the film surface after termination of photographing to thereby record the magnetic information, and it is held in the urged position after termination of one-frame movement until a continuous photographing signal is released.

10 Claims, 10 Drawing Sheets

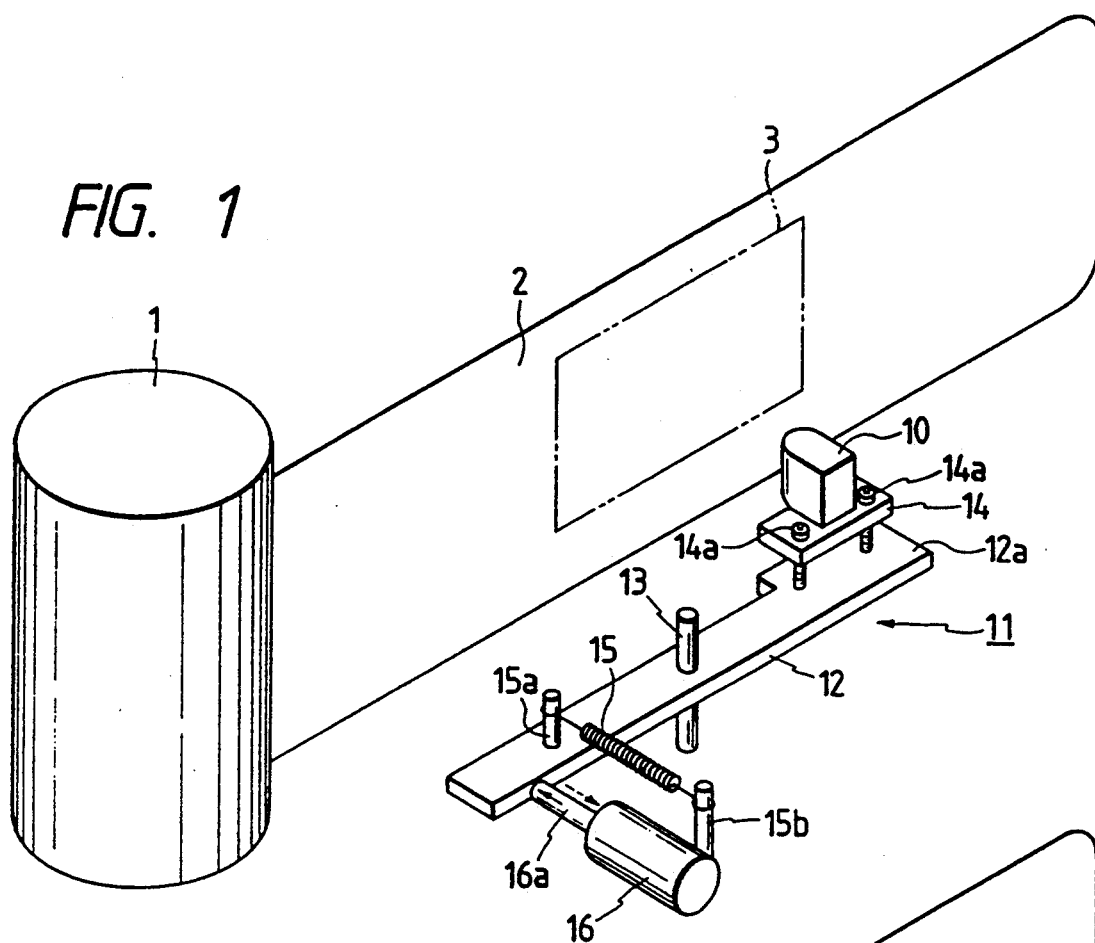
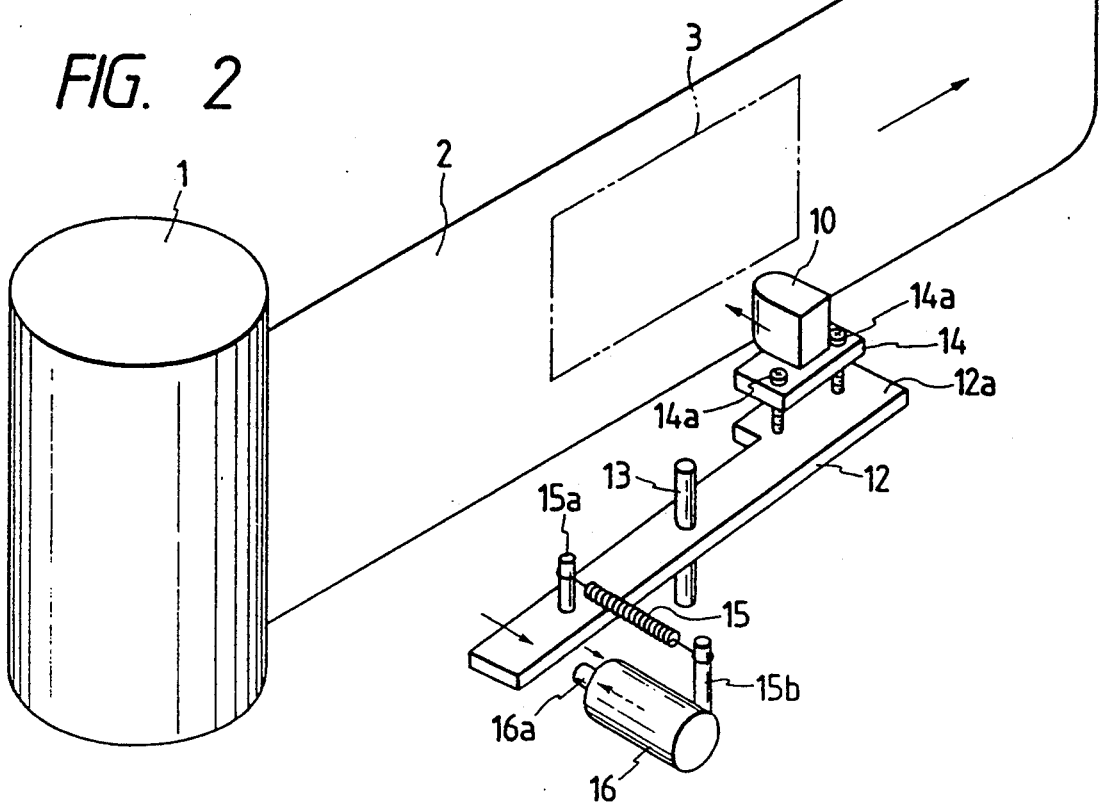

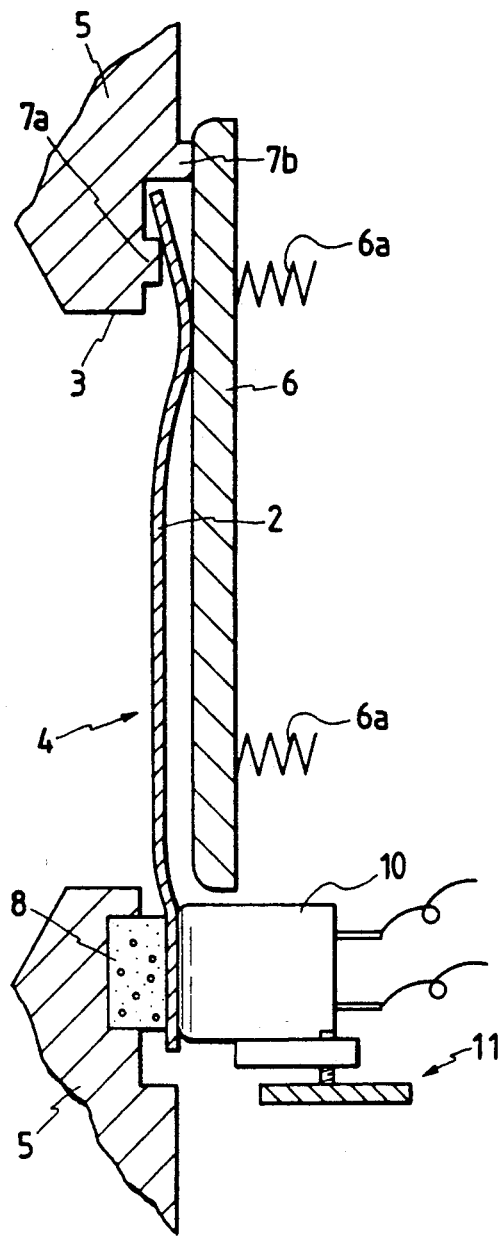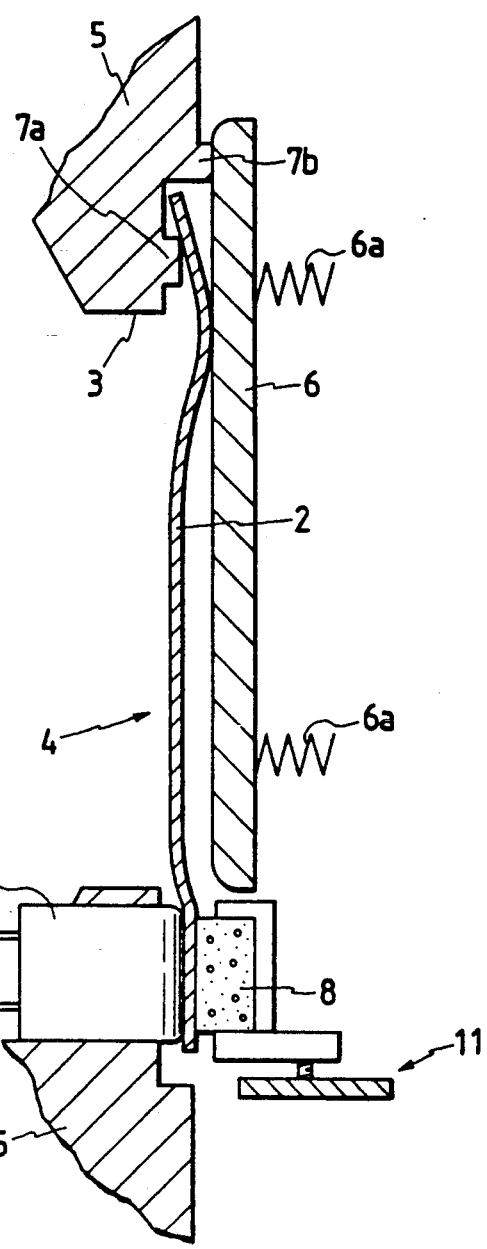

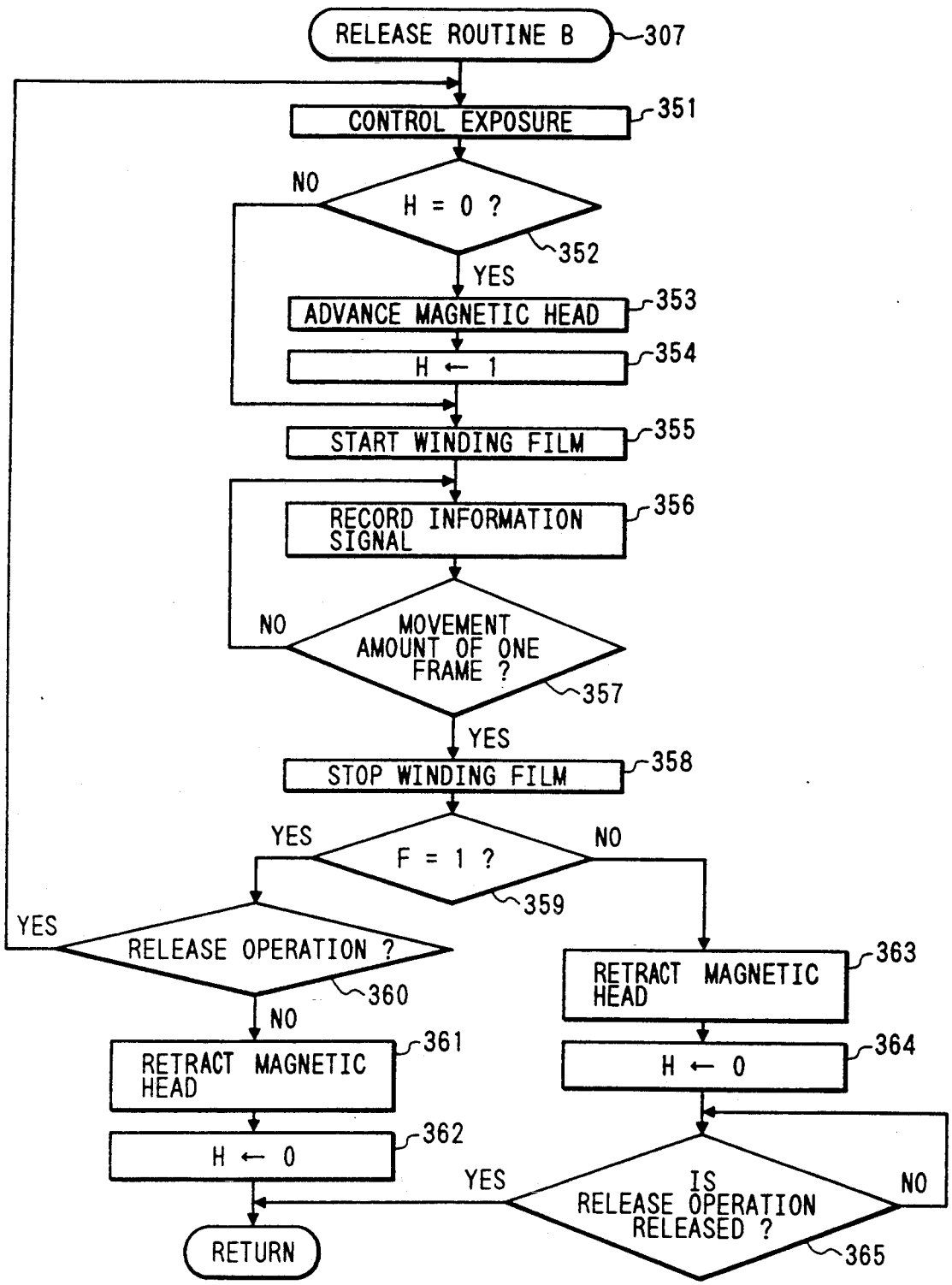

MAGNETIC RECORDING APPARATUS IN A CAMERA

This is a continuation of application Ser. No. 892,638 filed Jun. 2, 1992, which is a continuation of application Ser. No. 791,304 filed Nov. 14, 1991, which is a continuation-in-part of application Ser. No. 644,520 filed Jan. 23, 1991, all of which are now abandoned.

BACKGROUND OF THE INVENTION

1. Field of the Invention

This invention relates to a magnetic recording apparatus in a still camera in which a magnetic head for magnetic recording is urged against a magnetic recording medium having various kinds of photographing information such as exposure condition, etc. formed on the surface of film by a magnetic material when the film is moved, thereby magnetically recording the information. The invention relates more particularly to a driving mechanism for controlling the magnetic head so as to hold the magnetic head in a position retracted from the surface of the film during ordinary one-frame photographing and to maintain the magnetic head urged against the surface of the film during continuous photographing (continuous shot) in which a plurality of frames are continuously photographed.

2. Related Background Art

In 8 mm cinecameras or the like, it is common to magnetically record ambient sounds or the like during photographing. In such a cinecamera, for the reason that photographed images are moving images and for reasons relating to construction, such as the arranging of an image photographing portion corresponding to a photographing optical system and a sound recording portion, the image recording portion on the film and the sound recording portion corresponding to the image are spaced apart from each other in the direction of movement of the film. Accordingly, in the cinecamera, it is possible to consider the image recording on a film screen and the magnetic recording entirely independently of each other. Therefore disposition, construction, etc. of each portion is relatively simple and concern for the mutual interference between the two mechanism portions is entirely unnecessary. Stable image photographing and sound recording on the film can thus readily be accomplished.

The application of such a technique of magnetically recording information on film to a still camera or the like is also conceivable. In such case, the information to be recorded may include photographing information such as exposure and aperture during photographing, film speed condition, date and time of photographing or trimming information. If these bits of information are recorded on the surface of film during photographing, the exposure condition, etc. during printing can be set in conformity with the conditions during photographing by the information being read in the processing laboratory or the like, thereby improving the printed photographs. The photographing process may also be enhanced. For example, it would become possible to effect photographing on the premise that a portion of the screen is enlarged in advance, thereby obtaining such printed photographs as taken by the use of a telephoto lens even if the focal length of the photo-taking lens of the camera is limited.

In the case of a still camera, however, there are significant constraints which are not present in the case of a cinecamera. For example, there is little room for spacing of the photographing portion and the magnetic recording portion from each other. In addition, it is common to cut the film into suitable lengths as negatives. Both of the foregoing factors might suggest locating the magnetic head in a portion approximate to a film passageway which faces the aperture of the camera body in order to record information on or near the marginal side edge portion of the film as close as possible to the photographing screen. Such an arrangement, however, would lead to a further problem which notably does not arise in the cinecamera. In particular, the pressure contact force of the magnetic head against the film surface during photographing could cause bending or twisting of the film, resulting in reduced planarity of the film surface and consequent deviation of the focusing position relative to the surface.

Still cameras capable of magnetically recording information on a film have been proposed in the prior art. However, there remains a need for a camera which achieves a compact construction and which offers excellent performance despite the aforementioned constraints. For example, U.S. Pat. No. 4,860,037 discloses a magnetic recording type still camera system. However, in this system, a magnetic head records data on but a small area of a film leader and the head is always urged against the film surface, with possible adverse effects on the planarity of the film.

SUMMARY OF THE INVENTION

To meet the above-mentioned need, a magnetic recording apparatus in a camera according to the present invention is provided, for example, with a magnetic head for magnetic recording disposed in a portion proximate to the aperture of the camera body so as to be movable back and forth in a direction substantially orthogonal to the surface of the film and magnetically effecting information recording with the movement of the film when the magnetic head is urged against the surface of the film, driving means for moving the magnetic head or a pressure contact pad between an urged position in which the magnetic head is capable of magnetic recording and a retracted position in which the magnetic head is not capable of magnetic recording, determining means for determining one-frame photographing mode or continuous photographing mode, and means for causing the driving means to maintain the magnetic head or the pressure contact pad at the urged position after the termination of one-frame movement of the film when the determining means determines the continuous photographing mode and causing the driving means to move the magnetic head to the retracted position after the termination of one-frame movement of the film when the determining means determines the one-frame photographing mode.

BRIEF DESCRIPTION OF THE DRAWINGS

FIG. 1 is a schematic perspective view of a magnetic head driving mechanism showing an embodiment of a magnetic recording apparatus in a camera according to the present invention.

FIG. 2 is a schematic perspective view for illustrating the operation of the FIG. 1 mechanism.

FIG. 3 is a schematic cross-sectional view showing a film passageway portion corresponding to the aperture of the camera.

FIGS. 9A and 9B are flow charts for illustrating the operation of the third embodiment of the present invention.

FIG. 10 is a partial diagrammatic view of an improvement of the first, second and third embodiments of the present invention.

DETAILED DESCRIPTION OF THE PREFERRED EMBODIMENTS

Figure 4A:
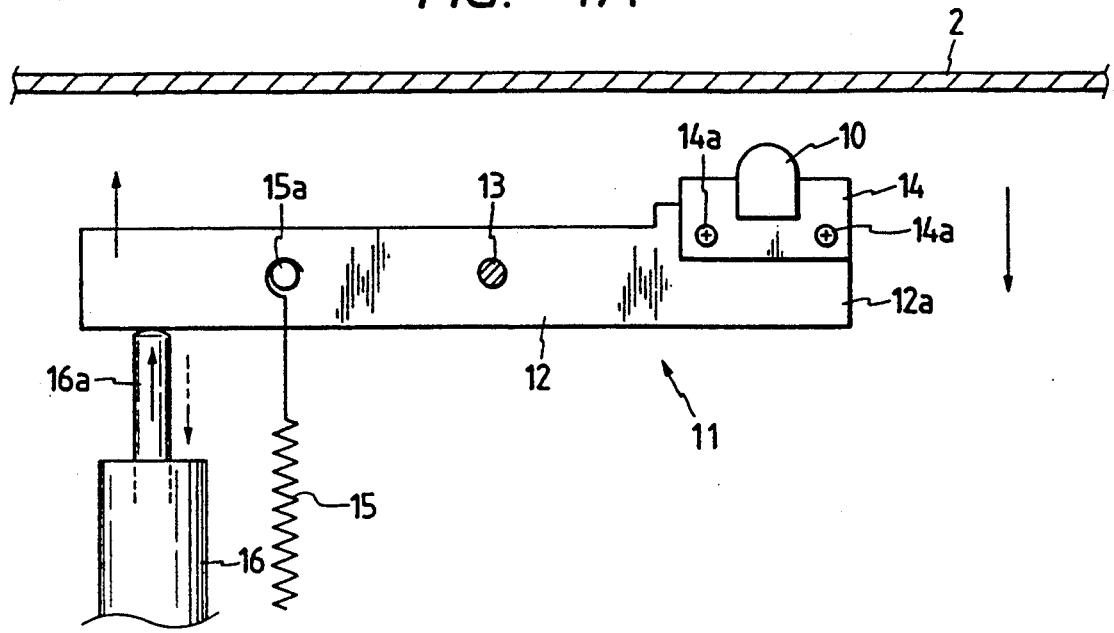
FIGS. 4A and 4B are schematic plan views for illustrating the back and forth moved states of the magnetic head with respect to the surface of film.

FIGS. 1 to 4 show an embodiment of a magnetic recording apparatus in a camera according to the present invention. In these figures, the reference numeral 1 designates a film cartridge containing therein film 2 in its wound state. On the surface of the film 2, there are formed a wellknown predetermined photographing screen (not shown) which is a recording medium on which optical information recording by photographing is to be effected and a magnetic information recording portion of a magnetic material (not shown) which provides a recording medium on which various kinds of photographing information are to be magnetically recorded. Such a cartridge 1 is inserted into a camera body (not shown) constituting a still camera, and the film 2 drawn out of this cartridge 1 may pass along a film passageway 4 (see FIG. 3) which faces the aperture 3 (indicated by dots-and-dash line in FIGS. 1 and 2) of the camera body and may be sequentially wound onto a film winding spool not shown) provided at the other side of the camera body. The above-mentioned film passageway 4, as shown in FIG. 3, is formed between the aperture 3 and a pressure plate 6. The aperture 3 is formed in a portion of the camera body 5 and directs light incident from a photo-taking lens system, not shown, to the predetermined photographing screen of the film 2. The pressure plate 6 is biased by springs 6a, 6a so as to press the film 2 from the back lid side (not shown) of the camera in such a manner that the film 2 is opposed to the aperture 3. The film passageway 4 formed between the aperture 3 and the pressure plate 6 is formed with an allowance greater than the thickness of the film 2 so that in this gap, the film 2 can assume a more or less free shape. The film 2 cannot maintain its perfectly planar state due to its own curling or the like and ideally, it is desirable that the widthwisely central portion thereof (including the portion which provides the predetermined photographing screen) contact with the pressure plate 6 and the opposite side edge portions thereof contact with upper and lower inner rail portions 7a (of which the lower one is not shown) of the camera body 5 whereby the film may become substantially planar. In FIG. 3, the reference denotes outer rail portions (of which the lower one is not shown) for restraining the pressure plate 6 with a predetermined gap relative to the aperture 3. The film passageway 4 is formed in the gap portion between the pressure plate 6 supported by these outer rail portions 7b and the aforementioned inner rail portions 7a.

Figure 4B:
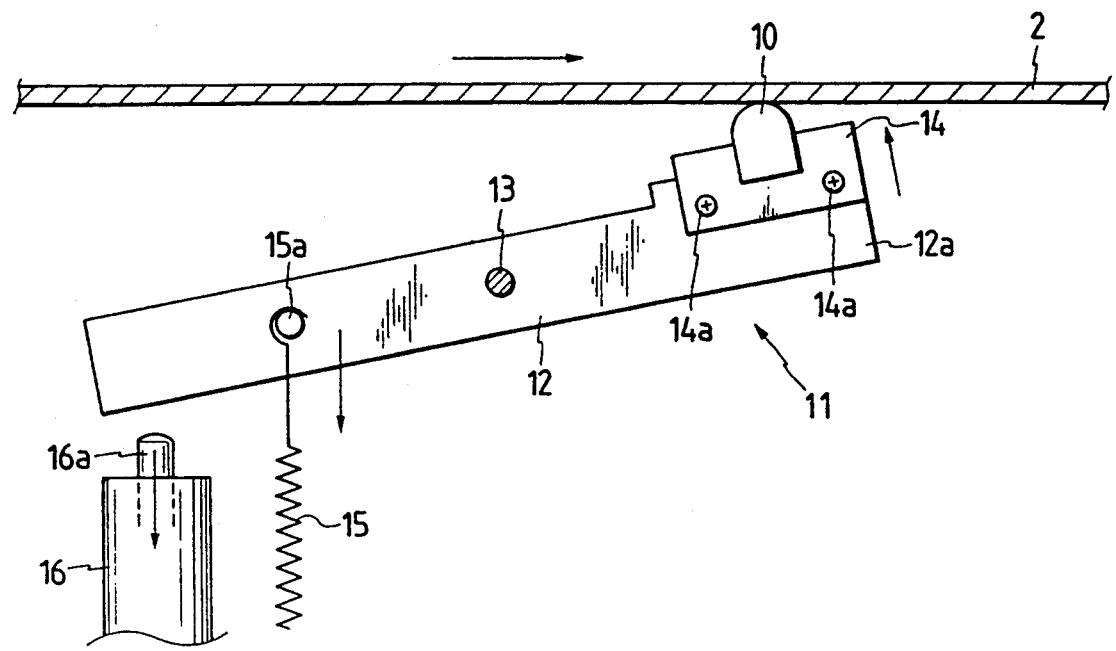

The reference numeral 10 designates a magnetic head for magnetically recording various kinds of photographing information disposed in opposed relationship with the lower edge portion of the film 2 proximate to the aperture, and the reference numeral 11 denotes a magnetic head driving mechanism for moving the magnetic head 10 back and forth in a direction substantially orthogonal to the surface of the film 2. This driving mechanism 11 is designed to normally hold the head 10 in a position retracted from the surface of the film 2 as shown in FIGS. 1 and 4A and to drive the head 10 so as to be urged against the surface of the film 2 as shown in FIG. 2 and 4B during the film winding after the termination of photographing. Design is made such that when the magnetic head 10 is urged against the film 2, as shown in FIG. 3, the film is held with necessary pressure between the head 10 and a felt-like pressure contact pad 8 provided in opposed relationship to the head 10 with the film 2 interposed therebetween so that magnetic information recording can be appropriately effected during film movement as will be described later.

The construction of the magnetic head driving mechanism 11 will now be described in detail. In these figures, the reference numeral 12 denotes a magnetic head holding lever pivotally supported by a rotatable shaft 13. The magnetic head 10, together with a fixing bracket 14 therefore, is fixedly held on a head holding portion 12a at one end of the holding lever 12. The head 10 is held in such a manner that the position thereof such as the inclination thereof is adjustable by two screws 14a and 14a for fixing the fixing bracket 14 to the lever 12.

The magnetic head holding lever 12 is biased counter-clockwise as viewed in the figures, i.e., in a direction in which the magnetic head 10 is urged against the surface of the film 2, by a tension spring 15 attached to the other end of the lever 12. The reference characters 15a and 15b designate hook pins which are provided on the lever 12 and a fixed portion, not shown, in the camera and to which a spring 15 is secured. The biasing force of the spring 15 is suitably set in conformity with the pressure contact force of the head 10 with respect to the surface of the film 2 and the positional relations between various portions.

The reference numeral 16 denotes a plunger such as an electromagnetic solenoid which has an engagement rod 16a selectively engageable with the other end of the lever 12 and which drives the lever 12 in a direction in which the head 10 is separated and retracted from the film 2 and maintains the head in that state. The plunger 16 is designed such that when it is not electrically energized, it holds the engagement rod 16a in its protruded state as shown in FIGS. 1, etc. by the biasing force of a spring or the like incorporated in the plunger, thus precluding the counter-clockwise roration of the lever 12 to thereby maintain the head 10 retracted from the film 2. When it is electrically energized, the plunger 16 has its internal movable iron core attracted and driven in the direction of broken-line arrow in FIG. 1 and as shown in FIG. 2, the engagement rod 16a is retracted into the plunger 16 to thereby permit the pivotal movement of the lever 12 by the spring 15. Thus the lever 12 is pivotally moved so that the head 10 may be urged against the surface of the film 2. By such pivotal movement of the lever 12, the head 10 becomes urged against the surface of the film 2 as shown in FIGS. 2 and 4B, and is kept in that state. If when in this state, the plunger 16 is electrically deenergized, the engagement rod 16a again assumes its protruded state by the biasing force of a spring or the like therein. The rod then comes into engagement with the lever 12 and pivotally moves this lever 12 clockwise as viewed in FIG. 2 against the biasing force of the spring 15 so that the head 10 may be retracted from the surface of the film 2, to thereby restore the state shown in FIGS. 1, etc.

A driving control circuit for controlling the driving of the magnetic head driving mechanism 11 constructed as described above and the driving control procedure thereof will now be described in detail with reference to FIGS. 5 and 6.

Figure 5:
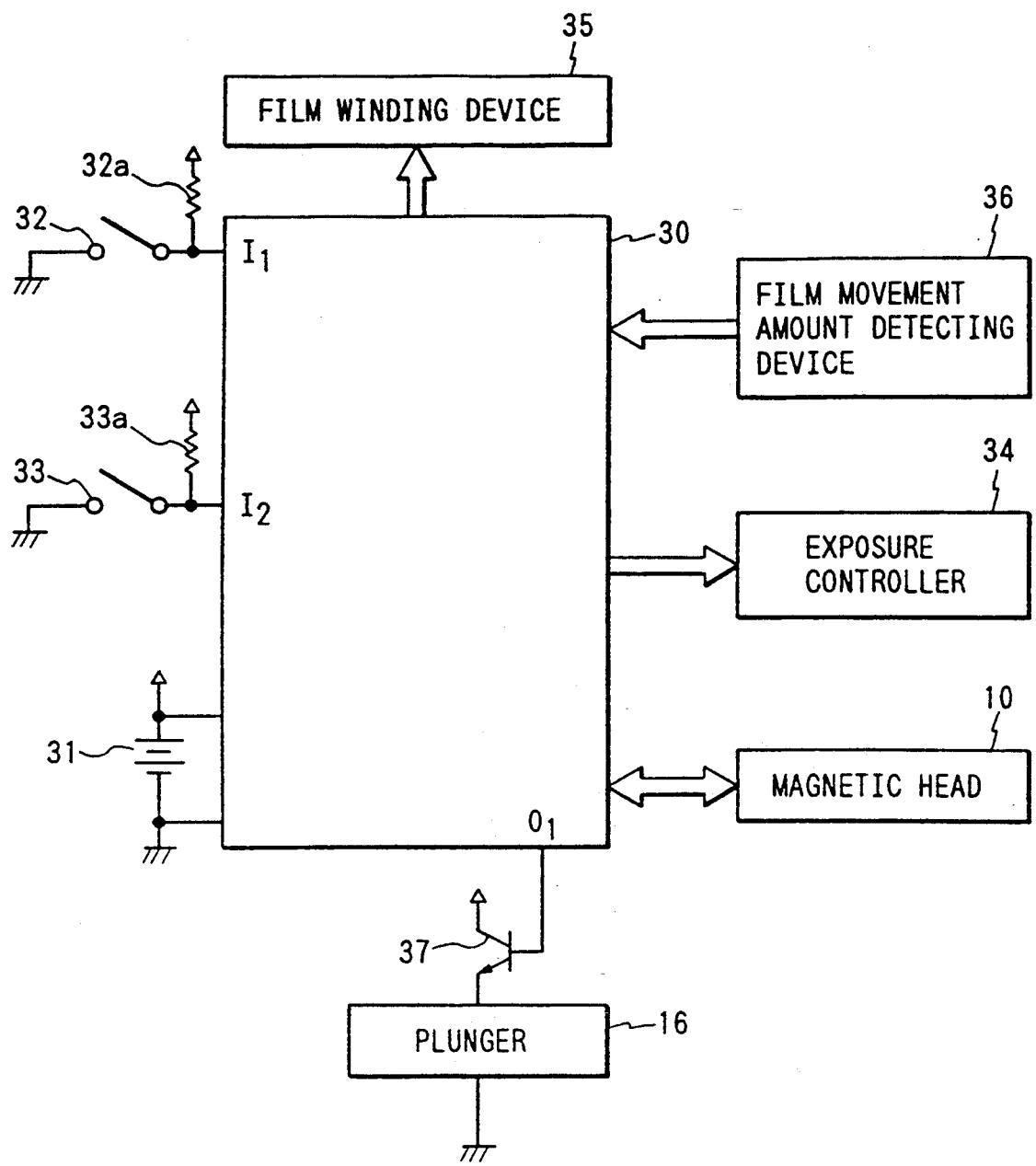
FIG. 5 is a block diagram of a circuit for effecting the apparatus operation.

FIG. 5 is a block diagram of a circuit for driving the magnetic head driving mechanism 11. In FIG. 5, the reference numeral 30 designates a microcomputer (hereinafter referred to as the CPU), the reference numeral 31 denotes a battery for supplying electric power to the CPU, and the reference numeral 32 designates a film detecting switch adapted to be closed by detecting the film 2 and designed to be operated in operative association with a film detecting member, not shown, provided, for example, in face-to-face relationship with a portion of the film passageway 4. This switch 32 has one end thereof grounded and has the other end thereof connected to the input port $I_1$ of the CPU 30 and connected to the battery 31 through a pull-up resistor 32a.

The reference numeral 33 denotes a release switch adapted to be closed in response to the depression of a release button, not shown. This switch 33 also has one end thereof grounded and has the other end thereof connected to the input port $I_2$ of the CPU 30 and connected to the battery 31 through a pull-up resistor 33a. The operation of this release switch 33 being closed will hereinafter be referred to as the release operation, and it is well known that the photographing operation is started by this operation.

The reference numeral 34 designates an exposure controller such as a shutter, a diaphragm or an aperture controller. The exposure controller is designed to control the shutter speed and aperture by a command from the CPU 30 and effect necessary photographing.

The reference numeral 35 denotes a film winding device comprised of a motor, a gear train, a sprocket, a spool, etc. The film winding device 35 effects the control of the start and stoppage of the winding of the film 2 by a command from the CPU 30.

The reference numeral 36 designates a film movement amount detecting device for detecting the amount of movement of the film 2 which comprises a sprocket, a roller, etc. The film movement amount detecting device 36 is designed to output a detection signal to the CPU 30 when it detects the amount of one-frame movement of the film 2.

Also, as shown in FIG. 5, the magnetic head 10 is connected so as to magnetically record the output information of the CPU 30 on the film 2. Of course, design may be made such that information magnetically recorded on the film 2 side can be input to the CPU 30 to thereby enable the magnetically recorded information to be reproduced.

The plunger 16 which is the magnetic head driving means is also connected to the CPU 30 through a transistor 37. By this transistor 37 being turned on the engagement rod 16a operated with the movable iron core in the plunger 16 is retracted as indicated by broken-line arrow in FIG. 1, whereby the state shown in FIG. 2 is brought about. Conversely, by the transistor 37 being turned off, the engagement rod 16a is protruded in the direction indicated by broken-line arrow in FIG. 2, whereby the state shown in FIG. 1 is brought about. The base of the transistor 37 is connected to the output port $O_1$ of the CPU 30, and the collector and emitter of the transistor 37 are connected to the battery 31 and the plunger 16, respectively. By the output port $O_1$ of the CPU 30 assuming a high level, the transistor 37 is turned on.

Figure 6:
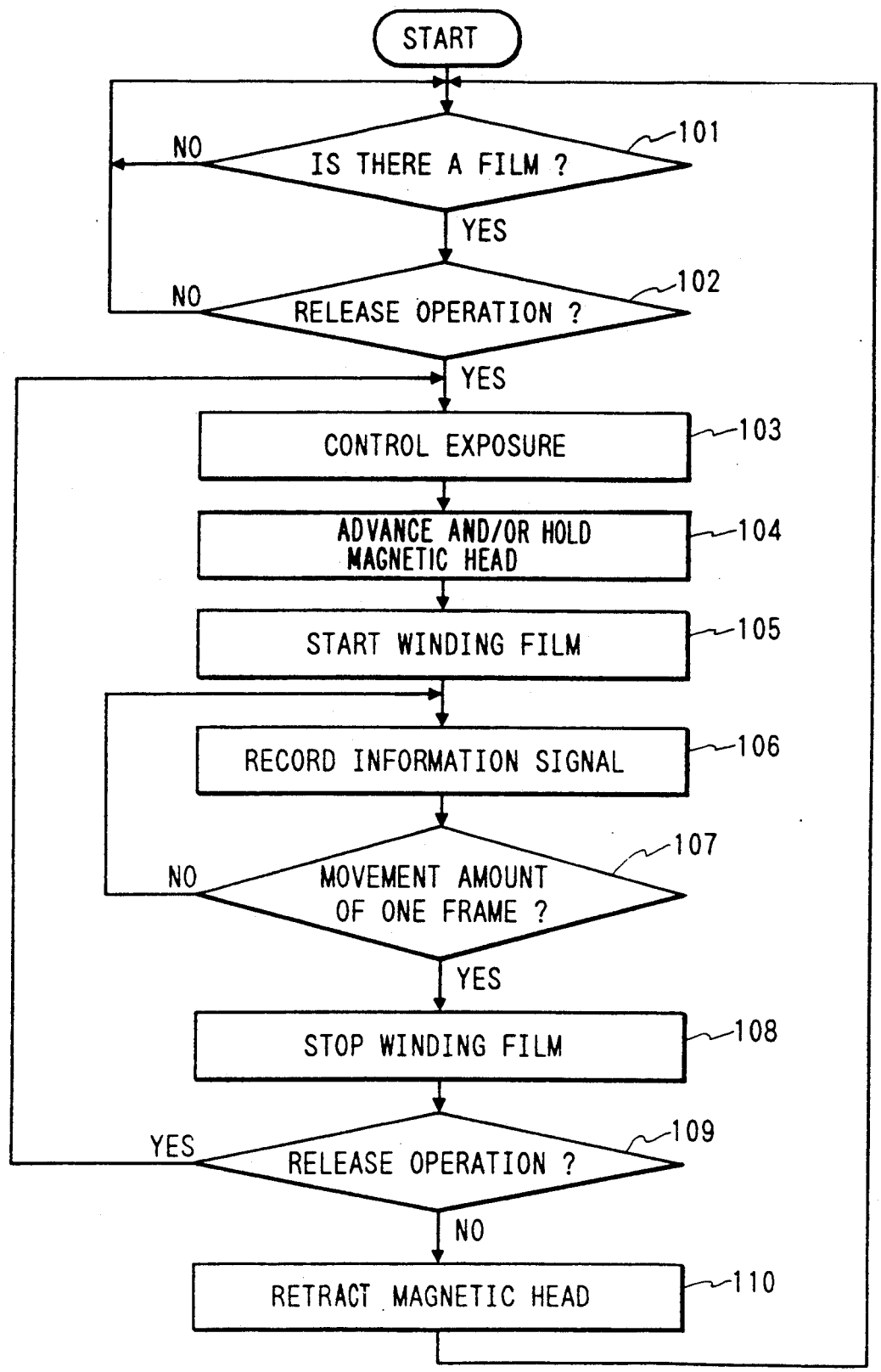
FIG. 6 is a flow chart for illustrating the apparatus operation.

In the above-described construction, when the battery 31 is inserted into the camera, the program of FIG. 6 starts, and the presence or absence of the film 2 is judged upon closing or opening of the film detecting switch 32 (step 101). If the film 2 is absent, the program stays at the step 101, and if the film 2 is confirmed, the program proceeds to a step 102.

At this step 102, whether the release operation has been effected is judged based upon closing or opening of the release switch 33. If the release operation has not been effected, return is made to the step 101, and if the release switch 33 is closed and it is judged that the release operation has been effected, the program proceeds to a step 103.

At this step 103, the introduction of various parameters necessary for exposure calculation such as the object luminance input from a light metering device, not shown, and the film speed input from a film speed setting device, not shown, is effected. The exposure value such as the shutter speed or the aperture value is calculated, and the exposure controller 34 is controlled to this value and the photographing operation is performed.

Subsequent to this exposure control during photographing, at a step 104, the plunger 16 is electrically energized to drive the magnetic head 10 from the state shown in FIG. 1 to the state shown in FIG. 2 and to hold the magnetic head in the latter state.

Then, at a step 105, a command signal is output to the film winding device to start the winding of the film 2, and at a step 106, an information signal is output to the head 10 to magnetically effect information recording on the film 2 being moved (or the reading of magnetic record may be effected).

At a step 107, whether the film 2 has been fed by an amount corresponding to one frame thereof is judged by the movement amount detecting device 36, and magnetic information recording is effected until the amount of feed corresponding to one frame is reached. When it is judged that said amount of feed has been reached, the program proceeds to the next step 108.

At this step 108, a command for stopping the winding operation is given to the film winding device 35 to thereby stop the film 2.

In this state, whether the release switch 33 is ON, that is, whether the mode is continuous shot which requires continuous photographing, is judged by a step 109. If it is judged that the switch 33 is ON and the release operation is being performed and the mode is continuous photographing, return is made to the step 103, where exposure control is effected, and subsequently, the operations of the steps 104-109 are repeated. It is noted that the repeat operations of step 104 serve to continue holding the magnetic head 10 in its already advanced state. The release operation is not being performed, that is, if the switch 33 is OFF, it is judged that the mode is not continuous shot (that is, the mode is ordinary one-frame photographing), and at a step 110, the plunger 16 is electrically deenergized and the magnetic head 10 returns from its urged state shown in FIG. 2 to its retracted state shown in FIG. 1, and return is made to the step 101.

To summarize briefly, according to the present invention, during the above-described photographing operation, whether the release button is depressed is discriminated after the film is wound by one frame and then stopped. If the release operation state is confirmed and it is judged that the mode is continuous photographing, unlike the case of one-frame photographing, the magnetic head 10 is maintained urged against the surface of the film 2 even when photographing is going on.

Such a construction can prevent the problem that during continuous photographing (continuous shot), the magnetic head 10 is retracted and then urged against the surface of the film 2 in a short time, whereby the position of the film 2 becomes unstable and deviation of the focus position occurs. The advantage of such a construction will be apparent.

According to the above-described construction, on the portion of the film 2 which is proximate to the photographing screen, exposure condition, trimming information, etc. are magnetically recorded by the magnetic head 10 during the winding of the film 2. Adverse effects such as the flexure and twist of the film 2 can be eliminated by the magnetic head 10 being maintained retracted during ordinary one-frame photographing and thus, the planarity of the film 2 can be kept and the focusing on the predetermined photographing screen of the film 2 can be reliably effected to thereby accomplish appropriate photographing.

On the other hand, during continuous photographing, the magnetic head 10 is not retracted each time the film is fed by one frame, but photographing is effected with the magnetic head 10 remaining urged against the surface of the film 2. This prevents problems such as the instability of the position of the film 2 and the deviation of the focus position by the head 10 being repetitively urged against and retracted from the surface of the film 2 in a short time, and thus, appropriate photographing can be accomplished.

Figure 7:
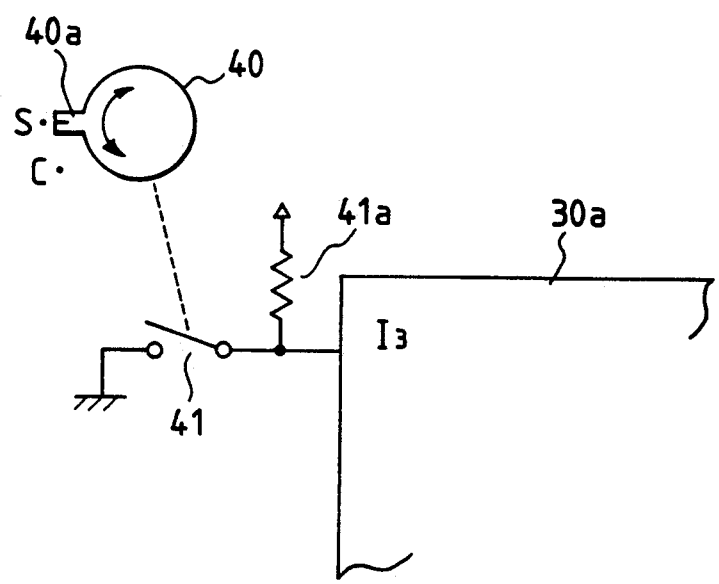
FIG. 7 is a partial diagrammatic view of showing a portion of the structure used in a second and a third embodiment of the present invention.
Figure 8A:
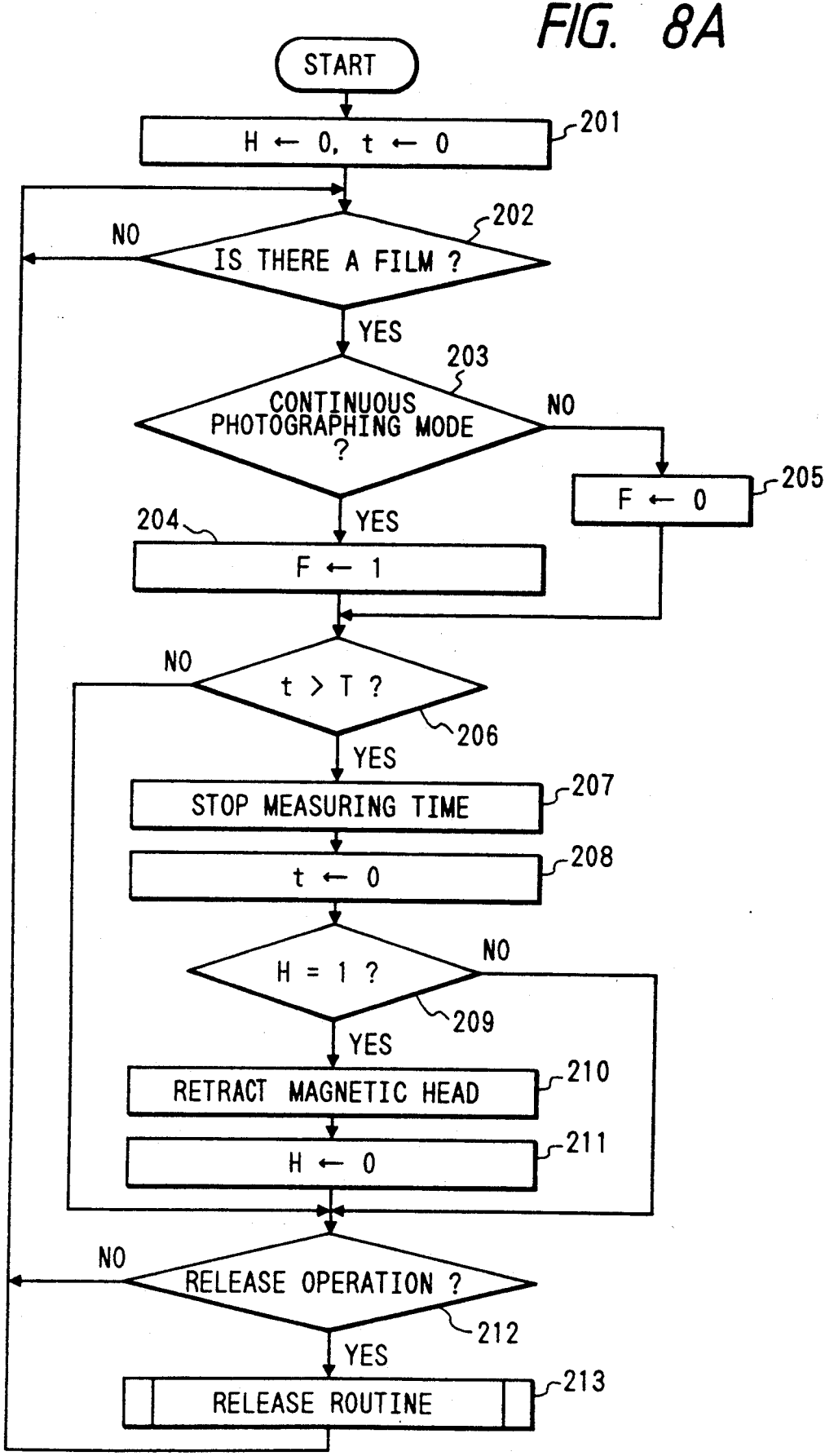
FIGS. 8A and 8B are flow charts for illustrating the operation of the second embodiment of the present invention.
Figure 8B:
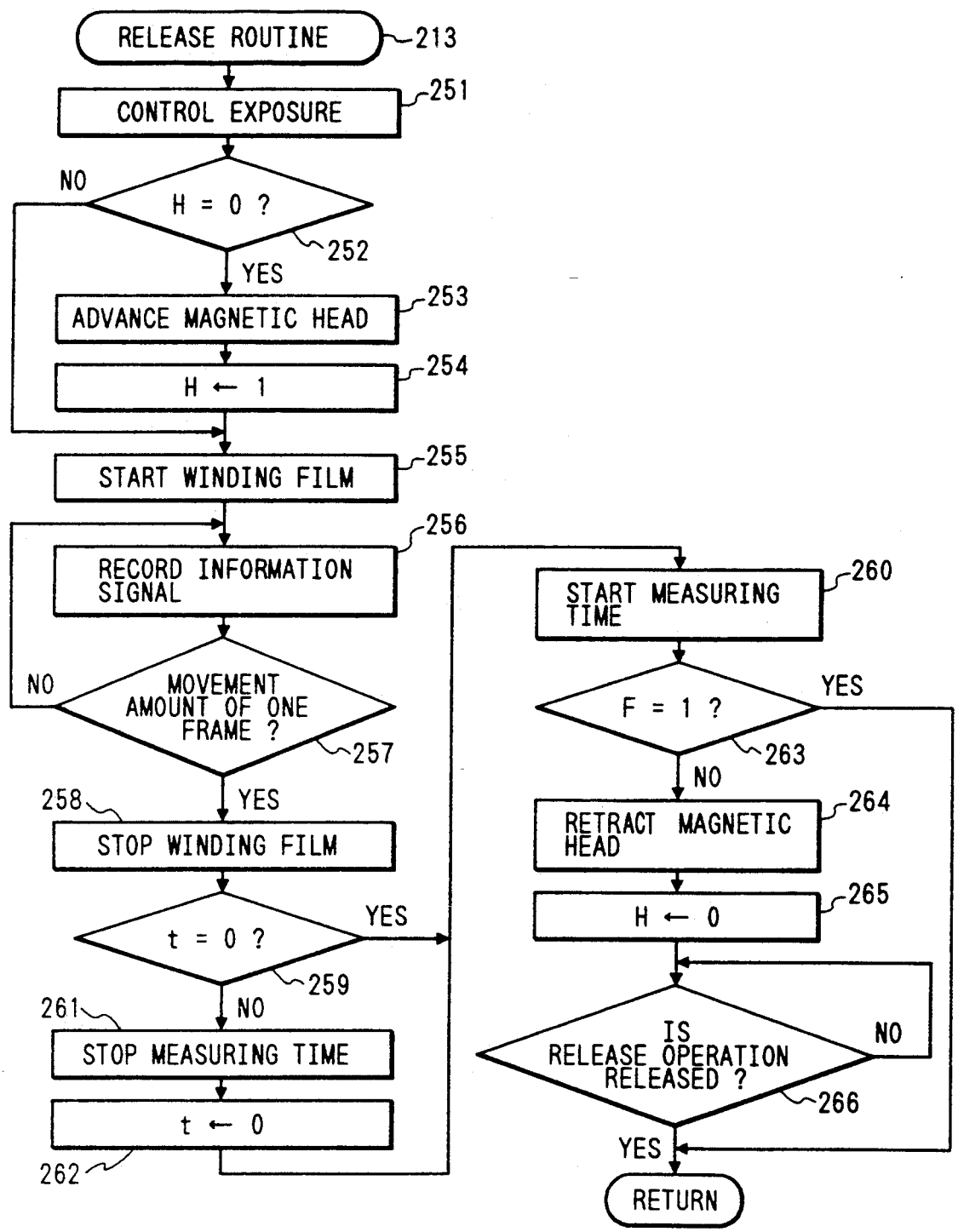

FIGS. 7, 8A and 8B shows a second driving control circuit for driving and controlling the magnetic head driving mechanism 11 and the order of driving and control thereof. In these figures, portions identical or corresponding to those in FIGS. 1 to 6 are given identical reference numerals and need not be described in detail.

Referring to FIG. 7 which shows only the portion diffrent from the block diagram of FIG. 5 a CPU 30a is provided with an input port $I_3$ in addition to input ports $I_1$ and $I_2$. The reference numeral 40 designates a driving mode changeover dial. By the pointer 40a of the dial 40 being registered with an index mark S or C provided on the camera body, a driving mode switch 41 can be closed and opened to thereby input the mode changeover state thereof to the CPU 30a. The driving mode switch 41 has one end thereof grounded and the other end thereof pulled up to the power source by a pull-up resistor 41a and connected to the input port $I_3$ of the CPU 30a. This driving mode switch 41 is closed and opened by the rotation of the driving mode changeover dial 40, whereby the CPU 30a can detect the set position (S or C) of the driving mode changeover dial 40, i.e., the driving mode. It is to be understood that S indicates the one-frame photographing mode and C indicates the continuous photographing mode.

FIGS. 8A and 8B are flow charts for illustrating the driving control operation of the magnetic head driving mechanism 11 provided with such a driving mode changeover device. Describing this briefly, when a battery 31 is inserted into, the camera, the main program starts and, as indicated in FIG. 8A, the initial reset of a flag H and a measured time t to to 0 is effected (step 201). The flag H, which becomes "1" when the magnetic head 10 is in pressure contact with the surface of the film 2, and becomes "0" when the magnetic head 10 is not in pressure contact with the surface of the film 2, is for indicating the state of the magnetic head 10.

After the above-described reset is effected, at a step 202, the presence or absence of the film 2 is judged by the closing or opening of the film detecting switch 32. If the film 2 is absent, the program stays at the step 202, and when the film 2 is confirmed, advance is made to a step 203. Then at this step 203, the judgment of the driving mode by the closing or opening of the driving mode switch 41 is done, and if the result of the judgment is the continuous photographing mode "C", advance is made to a step 204. If the result of the judgment is the one-frame photographing mode "S", advance is made to a step 205. In the steps 204 and 205, a flag F is set to "1" or "0", respectively, as shown. This flag F is a flag which becomes "1" in the case of the continuous photographing mode and becomes "0" in the case of the one-frame photographing mode, thus indicating the driving mode.

Subsequently, at a step 206, the judgment of the measured time t is made with respect to a predetermined time T of e.g. about 8 seconds, in order to prevent the head 10 from being in pressure contact with the surface of the film 2 for a long time after photographing. T may desirably be of the order of one minute or less. When $t > T$, advance is made to the next step 207, and when $t \leq T$, advance is made to a step 212 which will be described later.

At the step 207, the time measurement started at a step 260 in a release routine 213 which will be described later is stopped, and at a step 208, the measured time t is reset to "0".

Subsequently, at a step 209, the state of the magnetic head 10 indicated by the flag H is judged, and in the state of pressure contact of the magnetic head 10 in which $H=1$, advance is made to a step 210, where the supply of electric power to the plunger 16 is cut off to thereby return the magnetic head 10 from its pressure contact state to its retracted state. In accordance with this state of the magnetic head 10, at a step 211, the flag H is set to "0", and advance is made to a step 212.

It will be appreciated that by these steps 206–211, when the measured time t is equal to or less than the predetermined time T, the stoppage of the time measurement and the retraction of the magnetic head 10 are not effected. On the other hand, when the measured time t becomes greater than the predetermined time T, time measurement is stopped and the measured time t is reset to 0, and if the magnetic head 10 is in pressure contact with the surface of the film 2, such control that the magnetic head is returned to its retreated state is effected.

Thereafter, whether the release operation is performed is judged by the closing or opening of the release switch 33, and if the release switch 33 is closed, advance is made to the release routine of a step 213, and if the release switch is opened, return is made to the above-described step 202, and the operations of this and subsequent steps are repeated.

Here, this release routine 213 will be described with reference to FIG. 8B. First, parameters necessary for exposure calculation such as the inputs of the object luminance from a photometry device and the film speed from a film speed setting device are introduced, an exposure value such as a shutter speed or an aperture value is calculated, and the exposure controller 34 is controlled so as to assume this value, whereafter a photographing operation is performed (step 251).

At a step 252, the judgment of the state of the magnetic head 10 indicated by the flag H is done, and if the magnetic head 10 is in pressure contact with the surface of the film, that is, H=1, advance is made to a step 255 which will be described later. If H=0, that is, the magnetic head 10 is in its retracted position in its non-pressure contact state, at a step 253, the supply of electric power to the plunger 16 is effected and the magnetic head 10 is advanced the magnetic head moves from the state shown in FIG. 1 into the pressure contact state with respect to the surface of the film 2 shown in FIG. 2. Further at a step 254, in accordance with this state of the magnetic head 10, the flag H is set to "1". By the foregoing step if the magnetic head 10 is not in pressure contact with the surface of the film, control is effected so that the magnetic head may be brought into pressure contact with the surface of the film.

When as described above, the magnetic head 10 is brought into pressure contact with the surface of the film, at a step 255, a command signal is output to the film winding device 35 to start the winding of the film 2, and at a step 256, a required information signal is output to the magnetic head 10, whereby magnetic information recording onto the surface of the moving film is effected (or the reading of magnetic record may be effected).

At a step 257, whether the film 2 has been fed by the movement amount of one frame is judged by the movement amount detecting device 36, and magnetic information recording is effected until the movement amount of one frame is reached. When it is judged that the movement amount of one frame has been reached, advance is made to the next step 258, in which the film winding device 35 is instructed to stop the winding operation, whereby the film 2 is stopped.

Thereafter, at a step 259, whether the measured time t is t=0 is judged, and if t is not t=0, the program bypasses to steps 261 and 262 to stop the time measurement and reset the measured time t to 0, whereafter advance is made to a step 260. If at the step 259, it is judged that the measured time t is t=0, advance is made directly to the step 260, where time measurement is started.

Then, at a step 263, the judgement of the driving mode by the flag F is done, and if the driving mode is the mode C in which F=1, return is made to the main program shown in FIG. 8A, and if the driving mode is the mode S in which F=0, advance is made to a step 264, where the supply of electric power to the plunger 16 is cut off to return the magnetic head 10 from its pressure contact state shown in FIG. 2 to its retracted state shown in FIG. 1. When this magnetic head 10 comes to its retraction position, the flag H is reset to 0 in accordance with this state.

Subsequently, at a step 266, whether the release button is no longer depressed and the release operation has been released is judged by the opening of the release switch 33. The program stays at the step 266 until this opening is judged, and when this opening is judged, return is made to the main program. That is, design is made such that in the case of the one-frame photographing mode (the mode S), the release routine, i.e., photographing is judged to be ongoing until it is judged the depression of the release button has been released.

Thus in the mode C, return is made to the main program without the magnetic head 10 being retracted after time measurement has been started after the stoppage of the film winding. In the case of the mode S, time measurement is started after the stoppage of the film winding, whereafter the magnetic head 10 is retracted and the release of the depression of the release button is judged, and then return is made to the main program.

It will be appreciated that by the driving control operation as described above, driving control is effected such that in the case of the mode C, the magnetic head 10 is not immediately retracted after the termination of the film winding, but after the lapse of a predetermined time thereafter, and in the case of the mode S, the magnetic head 10 is retreated immediately after the termination of the film winding.

Figure 9A:
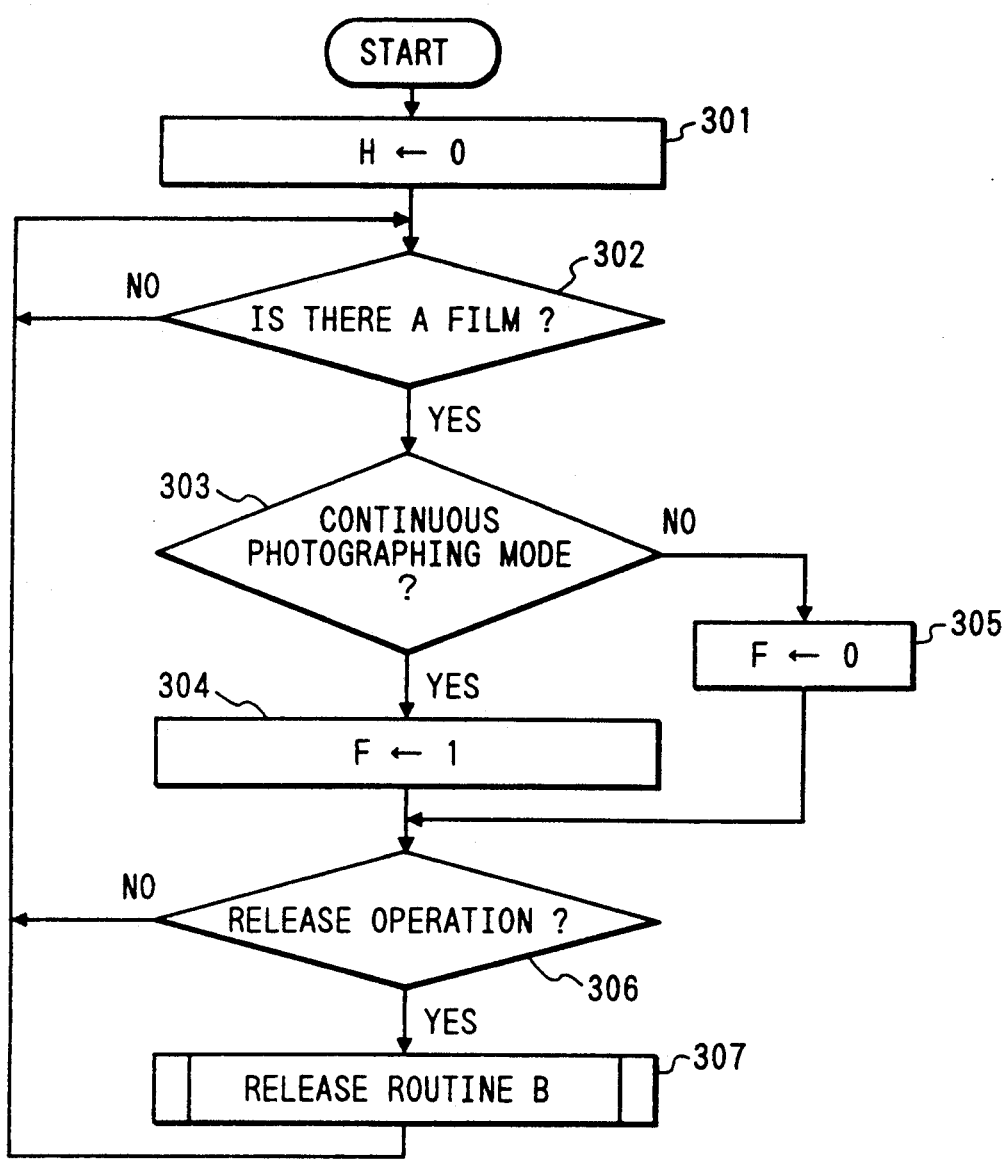

FIGS. 9A and 9B show a third embodiment for controlling driving of the magnetic head driving mechanism 11, and the driving will be described with respect to a case where a control circuit similar to that in the above-described second embodiment is used.

Describing first the main program shown in FIG. 9A, when the battery 31 is inserted into the camera, at a step 301, the flag H is reset to 0.

After this initial resetting has been effected, at a step 302, the presence or absence of the film 2 is judged by the closing or opening of the film detecting switch 32, and if the film 2 is absent, the program stays at the step 302. When the film 2 is confirmed, advance is made to a step 303. At steps 303, 304 and 305, the processing of the flag F similar to that of the aforedescribed steps 203, 204 and 205 is effected.

Subsequently, at a step 306, whether the release operation is performed is judged by the closing or opening of the release switch 33, and if the release switch 33 is closed, advance is made to the release routine B of a step 307. If the release switch 33 is opened, return is made to the above-described step 302, and the operations of this and subsequent steps are repeated.

Here, this release routine B307 will be described with reference to FIG. 9B.

In the exposure control of a step 351, an operation similar to that of the aforedescribed step 251 is performed.

Then, at a step 352, the judgment of the state of the magnetic head 10 by the flag H is done, and if the magnetic head 10 is in pressure contact with the surface of the film, that is, H=1, advance is made to a step 355 which will be described later. If H=0, that is, the magnetic head 10 is retracted and is in non-pressure contact state, at a step 353, the supply of electric power to the plunger 16 is effected and such that the magnetic head 10 is brought into pressure contact with the surface of the film 2. Further at a step 354, in accordance with this state of the magnetic head 10, the flag H is set to "1".

When as described above, the magnetic head 10 is brought into pressure contact with the surface of the film, at a step 355, a command signal is output to the film winding device 35 to start the winding of the film 2, and at a step 356, a required information signal is output to the magnetic head 10, whereby magnetic information recording onto the surface of the moving film is effected (or the reading of magnetic record may be effected).

Then, at a step 357, whether the film 2 has been fed by the movement amount of one frame is judged by the movement amount detecting device 36, and magnetic information recording is effected until the movement amount of one frame is reached. When it is judged that the movement amount of one frame has been reached, advance is made to the next step 358, where the film winding device 35 is instructed to stop the film winding operation, whereby the film 2 is stopped.

Thereafter, at a step 359, the judgment of the driving mode by the flag F is done. In the case of the mode C in which F=1, advance is made to a step 360, where whether the release switch 33 is ON, that is, whether after the termination of the film winding, the release switch is closed and the release operation is performed to effect continuous photographing, is judged. If the release switch 33 is ON, that is, continuous photographing is being effected, return is made to the step 351, and the subsequent steps are repeated. If the release switch 33 is OFF, that is, continuous photographing is not being effected, advance is made to the next step 361.

At this step 361, the supply of electric power to the plunger 16 is cut off to thereby return the magnetic head 10 from its pressure contact state shown in FIG. 2 to its retracted state shown in FIG. 1. In accordance with this state of the magnetic head 10, the flag H is reset to 0 (step 362), and return is made to the main program of FIG. 9A.

On the other hand, if judgment is F=0 at the step 359 and the mode is the mode S, advance is made to a step 363, where the supply of electric power to the plunger 16 is cut off to thereby return the magnetic head 10 from the state of FIG. 2 to the retracted state of FIG. 1. In accordance with this state, at a step 364, the flag H is reset to 0.

Then, at a step 365, whether the release button, not shown, is no longer depressed and the release operation has been released is judged by the opening of the release switch 33. The program stays at this step 365 until this opening is judged, and when this opening is judged, return is made to the main program. That is, design is made such that in the case of the one-frame photographing mode (the mode S), the release routine, i.e., photographing is judged to be ongoing until it is judged that the depression of the release button, not shown, has been released.

Thus in the mode C (continuous photographing) if the release operation is being performed after the stoppage of the film winding, exposure control is effected without the magnetic head 10 being retracted and if the release operation is not being performed, the magnetic head 10 is retracted.

Also, in the case of the mode S (one-frame photographing), the magnetic head 10 is retracted without fail after the stoppage of the film winding and advance is made to the next operation after it is judged that the depression of the release button is released, so that photographing may not be continuously effected.

In the third embodiment by the driving control operation as described above, if in the mode C (continuous photographing,) the release operation is being performed immediately after the stoppage of the film winding, the next photographing is effected without the magnetic head 10 being retracted. Also, driving control is effected such that when in the Continuous photographing mode (the mode C), the release operation is not being performed immediately after the film winding, or when in the case of the one-frame photographing mode (the mode S), the magnetic head 10 is brought into its retracted position immediately after the stoppage of the film winding.

The present invention is not restricted to the above-described embodiments, which can be suitably modified or changed in various ways. For example, in the above-described embodiment, the magnetic head 10 is provided on the magnetic head holding lever 12 and is designed to be selectively moved toward and away from the surface of the film 2 by the spring 15 and the plunger 16. It will be apparent, however, that other magnetic head driving structures may be used. In short, any construction which can effect the pressure contact and retraction of the head in the required condition will do.

As another example it has been described that magnetic recording is effected when the magnetic head 10 is urged against the surface of the film 2. However, it is possible that magnetic information prerecorded on the magnetic information recording portion of the surface of the film 2 can also be reproduced if the magnetic head 10 is endowed with the reproducing function.

In the aforedescribed embodiments as shown in FIG. 3, the felt-like pressure contact pad 8 is fixed to the camera body 5 and the magnetic head 10 is mounted on the magnetic head driving mechanism 11 and is moved. Alternatively as shown in FIG. 10, the magnetic head 10 may be fixed to the camera body 5 and the pad 8 may be attached to the driving mechanism 11 and may be made movable. The pad 8 may hold the film 2 in a required nipped state between it and the magnetic head 10 during recording or reproduction so that magnetic information recording or reproduction may be effected during the movement of the film.

As described above, the magnetic recording apparatus in the camera according to the present invention is provided with a magnetic head disposed in a portion proximate to the aperture of the camera body for movement toward and away from the surface of film in a direction orthogonal to the surface of the film and for magnetically effecting information recording with the movement of the film when the head is urged against the surface of the film, magnetic head driving means for holding the magnetic head in a position retracted from the surface of the film and driving the magnetic head so as to be urged against the surface of the film during the movement of the film after the termination of photographing, means for discriminating between one-frame photographing and continuous photographing, and means for controlling said magnetic head driving means so as to maintain the magnetic head urged against the surface of the film after the termination of one-frame movement of the film when it is judged by said discriminating means that the mode is continuous photographing, and to retract the magnetic head from the surface of the film after the termination of one-frame movement of the film when it is judged by said discriminating means that the mode is one-frame photographing.

Thus, with a simple construction, the head is maintained retracted from the surface of the film during ordinary one-frame photographing to thereby keep the planarity of the predetermined photographing screen of the film and eliminate the possibility of deviation or the like occurring to the focus position. As a result focusing on the predetermined photographing screen of the film can be reliably effected and appropriate photographing can be accomplished. On the other hand, during continuous photographing (continuous shot), the head is not retracted each time the film is fed by one frame. Father, photographing is effected with the head remaining urged against the surface of the film, thereby preventing problems such as the instability of the film position and the deviation of the focus position as could occur by the head being repetitively urged against and retracted from the surface of the film in a short time. As a result, appropriate photographing can be accomplished in the continuous mode as well.

What is claimed is:

1. A still camera usable with film which has a recording medium capable of recording thereon optical information obtained by photographing and various kinds of magnetic information being loaded in the body of said camera, said still camera including:
   a magnetic head for magnetically recording said magnetic information on said recording medium of said film with the movement of said film when said magnetic head is urged against the surface of said film;
   magnetic head driving means for selectively moving, in an area proximate to the aperture of said camera body, said magnetic head to a retracted position in which it is retracted from the surface of said film and an urged position in which it is urged against the surface of said film;
   determining means for determining whether the camera is being operated in a one-frame photographing mode or in a continuous photographing mode; and
   control means for controlling said magnetic head driving means such that said magnetic head is moved to said urged position by said magnetic head driving means after the termination of photographing of one frame to thereby record said magnetic information on said film with the movement of said film, and responsive to said determining means for controlling said magnetic head driving means
   (a) such that said magnetic head is then moved to said retracted position by said magnetic head driving means after the termination of one-frame movement of said film when said determining means has determined that the camera is being operated in the one-frame photographing mode, and
   (b) such that said magnetic head is then held in said urged position during continued photographing and film movement operations when said determining means has determined that the camera is being operated in the continuous photographing mode.

2. A still camera usable with film which has a recording medium capable of recording thereon optical information obtained by photographing and various kinds of magnetic information being loaded in the body of said camera, said still camera including:
   a magnetic head provided to oppose a first surface of said film and proximate to the aperture of said camera body for recording said magnetic information on said recording medium of said film with the movement of said film;
   a pressure contact pad;
   driving means for selectively moving said pressure contact pad to an urged position in which said pressure contact pad is urged against a second surface of said film which is opposite to said first surface to thereby urge said first surface of said film against said magnetic head, and to a retracted position in which said pressure contact pad is retracted from said second surface of said film;
   determining means for determining whether the camera is being operated in a one-frame photographing mode or in a continuous photographing mode; and
   control means for controlling said driving means such that said pressure contact pad is moved to said urged position by said driving means after the termination of photographing of one frame to thereby urge said first surface of said film against said magnetic head and record said magnetic information on said film with the movement of said film, and responsive to said determining means for controlling said driving means
   (a) such that said pressure contact pad is then moved to said retracted position by said driving means after the termination of one-frame movement of said film when said determining means has determined that the camera is being operated in the one-frame photographing mode, and
   (b) such that said pressure contact pad is then held in said urged position during continued photographing and film movement operations when said determining means has determined that the camera is being operated in the continuous photographing mode.

3. A still camera according to claim 1, which further comprises release means to be operated to start photographing and moving means for moving the film by one frame in response to the completion of photographing of one frame, and wherein said determining means determines that the camera is being operated in the continuous photographing mode when said release means is being operated after said moving means moves the film by one frame.

4. A still camera according to claim 1, further including a mode selecting member to be operated to select between the one-frame photographing mode and the continuous photographing mode, and said determining means determines whether the camera is being operated in the one-frame photographing mode or in the continuous photographing mode according to the mode selected by said selecting member.

5. A still camera according to claim 4, which further comprises release means to be operated to start photographing, and wherein said control means has time counting means and causes said magnetic head driving means to move said magnetic head from said urged position to said retracted position when said time counting means counts a predetermined period of time after the operation of said release means in the continuous photographing mode.

6. A still camera according to claim 1, which further comprises release means to be operated to start photographing, moving means for moving the film by one frame in response to the completion of photographing of one frame, and a mode selecting member to be operated to select between the one-frame photographing mode and the continuous photographing mode, and wherein said determining means determines that the camera is being operated in the continuous photographing mode when said release means is being operated after said moving means moves the film by one frame when said continuous photographing mode is selected by said mode selecting member.

7. A still camera according to claim 2, which further comprises release means to be operated to start photographing and moving means for moving the film by one frame in response to the completion of photographing of one frame, and wherein said determining means determines that the camera is being operated in the continuous photographing mode when said release means is being operated after said moving means moves the film by one frame.

8. A still camera according to claim 2, further including a mode selecting member to be operated to select between the one-frame photographing mode and the continuous photographing mode, and wherein said determining means determines whether the camera is being operated in the one-frame photographing mode or in the continuous photographing mode according to the mode selected by said selecting member.

9. A still camera according to claim 8, which further comprises release means to be operated to start photographing, and wherein said control means has time counting means and causes said driving means to move said pressure contact pad from said urged position to said retracted position when said time counting means counts a predetermined period of time after the operation of said release means in the continuous photographing mode.

10. A still camera according to claim 2, which further comprises release means to be operated to start photographing, moving means for moving the film by one frame in response to the completion of photographing of one frame, and a mode selecting member to be operated to select between the one-frame photographing mode and the continuous photographing mode, and wherein said determining means determines that the camera is being operated in the continuous photographing mode when said release means is being operated after said moving means moves the film by one frame when said continuous photographing mode is selected by said mode selecting member.

* * * * *